(12) United States Patent
Gastal (10) Patent No.: US 10,486,397 B2
(45) Date of Patent: Nov. 26, 2019

(54) MEANS-OF-TRANSPORT SIDE GLAZING WITH REINFORCED EMERGENCY-EXIT SUBSTRATE

(71) Applicant: SAINT-GOBAIN GLASS FRANCE, Courbevoie (FR)

(72) Inventor: Guillaume Gastal, Zary (PL)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 144 days.

(21) Appl. No.: 15/560,783

(22) PCT Filed: Mar. 24, 2016

(86) PCT No.: PCT/FR2016/050658
§ 371 (c)(1),
(2) Date: Sep. 22, 2017

(87) PCT Pub. No.: WO2016/151256
PCT Pub. Date: Sep. 29, 2016

(65) Prior Publication Data
US 2018/0079181 A1   Mar. 22, 2018

(30) Foreign Application Priority Data
Mar. 25, 2015 (FR) ..................... 15 52506

(51) Int. Cl.
*B32B 17/00* (2006.01)
*E06B 3/663* (2006.01)
(Continued)

(52) U.S. Cl.
CPC .. *B32B 17/10293* (2013.01); *B32B 17/10055* (2013.01); *B32B 17/1077* (2013.01);
(Continued)

(58) Field of Classification Search
CPC ........ B32B 17/10293; B32B 17/10055; B32B 17/1077; B32B 17/10798;
(Continued)

(56) References Cited

U.S. PATENT DOCUMENTS 5,593,784 A * 1/1997 Chinzi .............. B32B 17/10036
428/413

FOREIGN PATENT DOCUMENTS

CN       202788522 U    3/2013
DE       101 19 315 C1  7/2002
(Continued)

OTHER PUBLICATIONS

Machine translation of applicant cited reference EP 2642061. (Year: 2013).*
(Continued)

*Primary Examiner* — Donald J Loney
(74) *Attorney, Agent, or Firm* — Pillsbury Winthrop Shaw Pittman LLP (57) ABSTRACT

A side glazing for a transport vehicle, particularly glazing for a train, the glazing being fixed multiple glazing, the glazing including at least one connecting bridge which is separate from the glazing frame structure and makes a connection between a peripheral edge of the lamination and a surface, situated transversely opposite, on the other side of the glazing cavity.

16 Claims, 5 Drawing Sheets

(51) Int. Cl.
  *B32B 17/10* (2006.01)
  *B61D 25/00* (2006.01)
  *B60J 1/00* (2006.01)
  *B60J 1/14* (2006.01)
  *E06B 3/56* (2006.01)

(52) U.S. Cl.
  CPC .. *B32B 17/10761* (2013.01); *B32B 17/10798* (2013.01); *B60J 1/001* (2013.01); *B60J 1/14* (2013.01); *B61D 25/00* (2013.01); *E06B 3/56* (2013.01); *E06B 3/66342* (2013.01); *B32B 2605/006* (2013.01); *B32B 2605/10* (2013.01)

(58) Field of Classification Search
  CPC ........... B32B 2605/006; B32B 2605/10; E06B 3/66342; E06B 3/56; B61D 25/00; B60J 1/001; B60J 1/14
  See application file for complete search history.

(56) References Cited

FOREIGN PATENT DOCUMENTS

| | | |
|---|---|---|
| DE | 101 39 959 A1 | 3/2003 |
| DE | 102 07 600 C1 | 4/2003 |
| DE | 10 2006 057288 A1 | 6/2008 |
| EP | 0 114 257 A2 | 8/1984 |
| EP | 1 106 407 A2 | 6/2001 |
| EP | 2 363 284 A1 | 9/2011 |
| EP | 2 559 604 A1 | 2/2013 |
| EP | 2 642 061 A2 | 9/2013 |
| FR | 2 712 840 A1 | 6/1995 |

OTHER PUBLICATIONS

International Search Report as issued in International Patent Application No. PCT/FR2016/050658, dated Jun. 2, 2016.

\* cited by examiner

MEANS-OF-TRANSPORT SIDE GLAZING WITH REINFORCED EMERGENCY-EXIT SUBSTRATE

CROSS-REFERENCE TO RELATED APPLICATIONS

This application is the U.S. National Stage of PCT/FR2016/050658, filed Mar. 24, 2016, which in turn claims priority to French patent application number 1552506 filed Mar. 25, 2015. The content of these applications are incorporated herein by reference in their entireties.

The invention relates to the creation of a side glazing for a means of transport, particularly glazing for a train, said glazing being fixed multiple glazing, possibly with an opening window.

Such glazing usually comprises:
an exterior substrate having an exterior face which faces an exterior space, an intermediate face on the opposite side to the exterior face, and a peripheral edge face,
an interior substrate having an interior face which faces an interior space, an intermediate face on the opposite side to the interior face, and a peripheral edge face,
and a glazing frame structure which holds the exterior substrate and the interior substrate together in such a way that the glazing separates said exterior space from said interior space with a glazing cavity situated between the exterior substrate and the interior substrate.

If the glazing can be opened, said exterior substrate and said interior substrate each comprise, in an upper part, a hole opening onto each face of the substrate and separated from the peripheral edge face of the substrate, the holes in the substrates facing one another so as to allow the creation of the opening window, and the glazing frame structure furthermore holds the two substrates around the holes.

In order for glazing to qualify as safety glazing it also comprises a lamination comprising on the one hand at least one main sheet of glass of glass and, on the other hand, a main sheet of plastic, said main sheet of plastic being situated in contact (without a space) between, on the one hand, the intermediate face of said exterior substrate and, on the other hand, the main sheet of glass.

French patent application No FR 2 712 840 discloses the creation of safety double glazing in which the exterior substrate is laminated. FIGS. 1 and 2 of that document show that the glazing frame structure that holds the exterior substrate and the interior substrate together to form the glazing cavity comprises, on the one hand, a spacer (referenced 8 and 18 in these figures) and, on the other hand, an adhesive substance (referenced 9 and 19 in these figures).

A side glazing structure for a means of transport, this glazing being fixed multiple safety and emergency exit glazing, without an opening window, is moreover known in the prior art from European patent application No EP 2 363 284, particularly the variant in FIG. 2. That document discloses a solution that makes breaking the glazing easier, thus making evacuation easier.

In that document, it is proposed for lamination reinforcing a glazing substrate not to be in contact with a peripheral glazing frame structure by having this lamination set back from this peripheral structure. This setback is the same all the way around the periphery of the substrate; the distance between the edge face of the lamination and the edge face of the substrate bearing it is the same all along the periphery.

A fixed side glazing with an opening window for a means of mass transport is also known from the prior art, from Chinese utility model No CN 202788522.

That glazing has a satisfactory appearance thanks to the substrates each of which has a rectangular hole in order to allow the opening window to be created.

That glazing offers satisfactory thermal insulation capabilities thanks to the presence of the glazing cavity between the two substrates.

However, that glazing cannot be qualified as "safety" glazing because the glass substrates, even though one or both has or have undergone a chemical or heat treatment aimed at strengthening it or them, cannot be used to create glazing that is safety glazing in the sense that if an object strikes one of the substrates and breaks it, that means that this object very probably has enough energy to be able to break the other substrate and thus completely break the glazing.

Only a lamination comprising at least one sheet of plastic then one sheet of glass which are provided in that order on a surface of a substrate yields a safety glazing. Such safety glazing is more resistant to impacts, while at the same time if need be allowing evacuation once the glass substrates have been broken and the sheet of plastic has been cut away.

One major disadvantage with means-of-transport safety multiple glazings is that when the exterior substrate breaks during a journey under an impact from an exterior object, it then becomes necessary, for passenger safety, to evacuate all of the passengers from the compartment the glazing of which has a broken exterior substrate.

It is an object of the invention to make it possible to create fixed multiple glazing, potentially with an opening window, that is easier to destroy in an exterior part, while at the same time allowing this exterior part to be held in position if it is broken unintentionally (in a situation other than an emergency evacuation).

The invention thus relies on providing a reinforcing lamination in the exterior part of the glazing (and in the exterior part of the glazing situated under the opening window if there is one), and on also providing means for keeping this lamination attached to the glazing if the exterior substrate is broken unintentionally and, more specifically, to keep this lamination attached to a surface situated facing the glazing cavity with respect to this lamination, and independently of the glazing frame structure.

In its broadest acceptance, the subject of the invention is a side glazing for a means of transport, particularly glazing for a train, according to claim 1. This glazing is fixed multiple glazing comprising:
an exterior substrate having an exterior face which faces an exterior space, an intermediate face on the opposite side to the exterior face, and a peripheral edge face,
an interior substrate having an interior face which faces an interior space, an intermediate face on the opposite side to the interior face, and a peripheral edge face,
a glazing frame structure which is situated at the periphery of the intermediate face of said exterior substrate and at the periphery of the intermediate face of said interior substrate and which holds the exterior substrate and the interior substrate together in such a way that the glazing separates said exterior space from said interior space with a glazing cavity situated between the exterior substrate and the interior substrate,
and a lamination comprising, on the one hand, at least one main sheet of glass and, on the other hand, a main sheet of plastic, said main sheet of plastic being situated in contact between the intermediate face of said exterior substrate and the main sheet of glass.

The glazing according to the invention is notable in that it further comprises at least one connecting bridge which is separate from said glazing frame structure and makes a connection between a peripheral edge of said lamination and a surface, situated transversely opposite, on the other side of said glazing cavity.

This connecting bridge mechanically attaches this peripheral edge of said lamination and the surface situated on the other side of said glazing cavity, transversely facing one another. A connecting bridge is different from a spacer (or spacing piece) in the usual sense of the art considered here, because a connecting bridge does not mechanically contribute to creating and maintaining the glazing cavity situated between the exterior substrate and the interior substrate in normal use of the glazing (when the exterior substrate is intact); it is the glazing frame structure that creates and maintains this glazing cavity, in particular by comprising a spacer.

In one sense, the connecting bridge contributes to the existence and maintaining of a certain glazing cavity situated between the exterior substrate and the interior substrate when the exterior substrate is broken and held in place by the lamination and the connecting bridge, but it is not a usual glazing cavity: the issue here is merely that of making it possible to maintain a certain intactness of the glazing so as to allow the means of transport to continue on its journey as far as the proper parking facility thus making it possible to avoid having to immobilize the means of transport until the glazing can be replaced.

This connecting bridge is thus preferably situated between, on the one hand, a peripheral edge of the intermediate face of the interior substrate and, on the other hand, a peripheral edge of the central intermediate face of the main sheet of glass (the one facing toward the glazing cavity) and/or a peripheral edge of the central intermediate face of the main sheet of plastic (the one facing toward the glazing cavity). This connecting bridge thus creates a mechanical connection between a peripheral edge of the face situated on the one side of the glazing cavity and a peripheral edge of that (those) situated on the other side of the glazing cavity; this connecting bridge adheres to the two surfaces facing one another transversely, one on each side of said glazing cavity.

For preference, said lamination is not in direct contact with the glazing frame structure or is not directly mechanically connected and/or chemically bonded to the glazing frame structure, namely said main sheet of glass and said main sheet of plastic are not in direct contact with said glazing frame structure or are not directly mechanically connected and/or chemically bonded to the glazing frame structure, whereas the interior substrate and the exterior substrate are both in direct contact with said glazing frame structure and are both mechanically connected and/or chemically bonded (are attached) directly to the glazing frame structure.

Said main sheet of glass and said main sheet of plastic are thus preferably set back by at least 2 mm and preferably by between 2 and 5 mm with respect to said glazing frame structure. This setback is preferably constant all around the main lamination. A setback value in this range from 2 to 5 mm means that the lamination can strengthen the substrate bearing it as much as possible while at the same time being enough to preserve the integrity of the glazing structure and also ensure that this setback is not very visible from the interior by maintaining the widest possible field of view through the lamination.

Thus, when the glazing is oriented vertically, the lamination comprising the main sheet of glass and the main sheet of plastic is placed against that surface of the exterior substrate that is oriented toward the glazing cavity; this lamination stops at the top, at the sides, and at the bottom, some distance away from the peripheral edge face of the substrate that bears it so that when this bearing substrate is broken unintentionally in the region in which it is not laminated, the connecting bridge holds the substrate bearing the lamination and the lamination.

If the bearing substrate is intact, it is still possible to separate the lamination-bearing substrate and the lamination from the remainder of the glazing so as to allow emergency evacuation, by breaking or cutting the connecting bridge beforehand.

For preference, each substrate is made of glass that has undergone a chemical or heat treatment aimed at strengthening it.

It is possible to create the connecting bridge so that it is continuous or discontinuous along its periphery.

When the connecting bridge is continuous over its peripheral length, it is then separated from said glazing frame structure over its entire peripheral length, so as to give the lamination (and the exterior substrate) effective retention.

When the connecting bridge is discontinuous over its peripheral length, it is present, separated from said glazing frame structure, over a peripheral length of between 20% and 95%, or even between 30 and 50%, of the peripheral length of said lamination (namely along the length of the edge face of the main sheet of glass of the lamination). In this way it becomes possible to reduce the weight of the glazing.

It is possible for example to plan for the glazing to comprise four collecting bridges, one along each edge (top, bottom, right, left) of the lamination and along a length, for example for each of the edges, of between one third and one half of the length of the edge of the lamination (which means to say the length of the edge face of the edge of the main sheet of glass in the lamination).

For preference, said connecting bridge is situated at a distance which, at the shortest, is between 2.0 and 30.0 mm, and preferably at a distance which, at the shortest, is between 5.0 and 20.0 mm, away from said glazing frame structure. It is thus possible to create a peripheral rupture zone for the exterior substrate that is large enough, without excessively decreasing the field of view. This distance is preferably constant along the entire periphery of the glazing frame structure (irrespective of whether the connecting bridge is continuous or discontinuous).

The connecting bridge may comprise a bead of adhesive, in particular one based on polyurethane or on silicone or on MS polymer, (namely modified silane polyether) or on polysulfide, so that the chemical bond on each side of the glazing cavity is strong.

The connecting bridge may comprise a profiled metal section which is bonded laterally on each side of the glazing cavity, with such a bead of adhesive, or may be fully or partly incorporated into such a bead of adhesive.

The connecting bridge could comprise a cable, notably a metal cable, bonded laterally on each side of the glazing cavity.

For preference, said connecting bridge is situated, when viewed from the interior and/or when viewed from the exterior, behind a masking strip, so that sight of this connecting bridge will not give rise to the assumption that the glazing is not an emergency exit.

It is preferable for each substrate to be made of a glass that has undergone a chemical or heat treatment aimed at strengthening it.

In a first embodiment, the glazing is simple glazing.

In a second embodiment, the glazing can be opened. In this second embodiment, said exterior substrate and said interior substrate each comprise, in an upper part, a hole opening onto each face of the substrate and separated from the peripheral edge face of the substrate, the holes in the substrates facing one another so as to allow the creation of an opening window, the glazing frame structure furthermore holding the two substrates around the holes and, in a part of the glazing that is situated under said window, said lamination is not in contact with said glazing frame structure. Thus, when the glazing is oriented vertically, the lamination comprising the main sheet of glass and the main sheet of plastic is preferably positioned beneath the opening window; this lamination therefore stops at the top a distance below a lower peripheral edge of the hole in the substrate, which makes it possible to create the window, and on the sides and at the bottom a distance away from the peripheral edge face of the substrate bearing it, so that when this lamination is broken in order to allow for emergency evacuation, its destruction has no influence on the integrity of the glazing all around it and quite particularly has no influence above, on the integrity of the window.

Because this main lamination is situated below the opening window, it does not extend over the left and right sides of the opening window, or above the opening window (when the glazing is considered vertical).

The main lamination stops in its upper part below a horizontal line produced by the lower edge of the hole in the substrate bearing the main lamination, this line being fictitiously extended onto the substrate that bears the main lamination, to left and right of the hole.

In this second embodiment, said glazing frame structure, for preference, comprises a horizontal crossmember situated underneath said window, said crossmember not being in contact with two lateral uprights of the glazing frame structure.

Said glazing cavity is preferably situated all around said window (this glazing cavity is in one piece) so as not to impede the "emergency exit" function.

The glazing according to the invention preferably does not comprise any element that projects toward the exterior beyond the exterior face of the exterior substrate, this being so as to reduce the friction of the means of transport through the air.

Each sheet of plastic used for the glazing according to the invention has the ability to enhance the mechanical strength by causing the sheet of glass placed on top to adhere to the substrate or to the pane element placed below; in this glazing, at least one of these sheets of plastic, or even all these sheets of plastic, may also have noise insulation capabilities.

Advantageously, the present invention thus makes it possible to create a fixed multiple glazing for a means of transport that has high thermal insulation properties, high mechanical integrity properties, while at the same time being able to be used as an emergency exit, with the certainty that even if this emergency exit is accidentally broken on the lamination side, it will remain present in the glazing.

Thus, by virtue of the presence of the bridge (or bridges) holding the lamination—and therefore the exterior substrate—to the interior substrate or to an element directly attached thereto, the glazing maintains a certain integrity when the exterior substrate becomes broken: the means of transport can continue to run and in particular experience the usual increases and decreases in pressure of its normal operation, particularly when passing another means of transport or when entering, passing through and leaving a tunnel. Even if the glazing has to be changed following breakage of the exterior substrate, that can wait until the end of the journey that the means of transport is making with its passengers to its final destination. There is no longer any need to immediately evacuate the passengers from the compartment that has a broken exterior substrate to its glazing.

The present invention in particular makes it possible, when the glazing comprises an opening window, for the glazing space situated under the opening window to be used as an emergency exit while maintaining the intactness of the rest of the glazing, namely by allowing the window structure to remain in place so as not to impede the evacuation, underneath, through the emergency exit thus created.

Advantageously, the present invention thus makes it possible to create fixed multiple glazing, possibly with an opening window, which has a smooth exterior appearance with no mechanical element further toward the exterior than the exterior face of the exterior substrate.

The details and advantageous features of the invention will become apparent from the following nonlimiting examples illustrated by the attached figures which illustrate:

In order to make FIGS. 1 to 8 easier to study, the various elements are drawn to scale; the same references denote the same elements throughout the figures.

Figure 1:
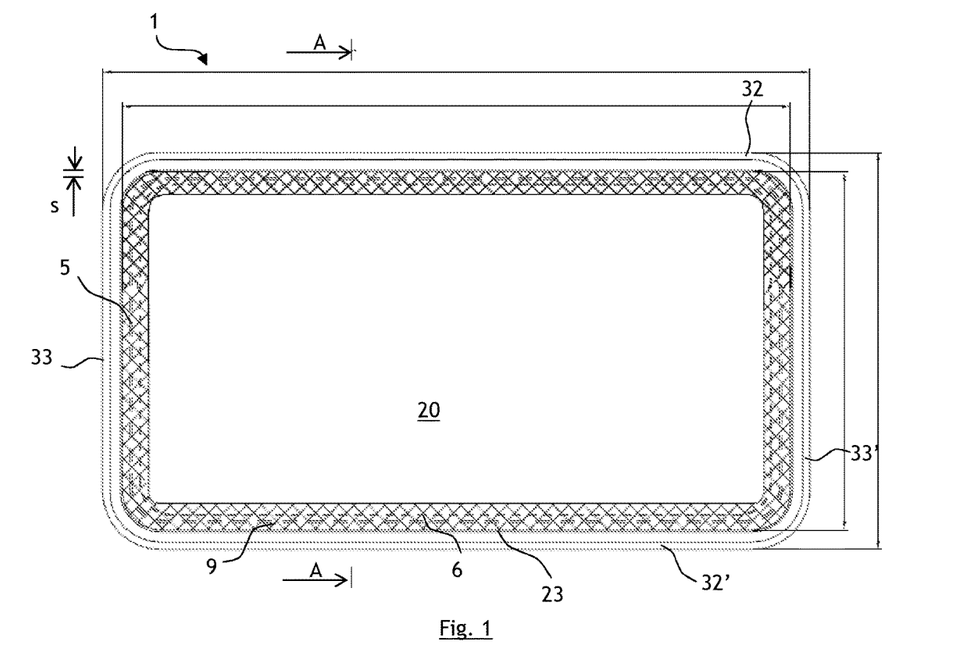
in FIG. 1, a first embodiment of glazing according to the invention, without an opening window, viewed from the interior space.
Figure 5:
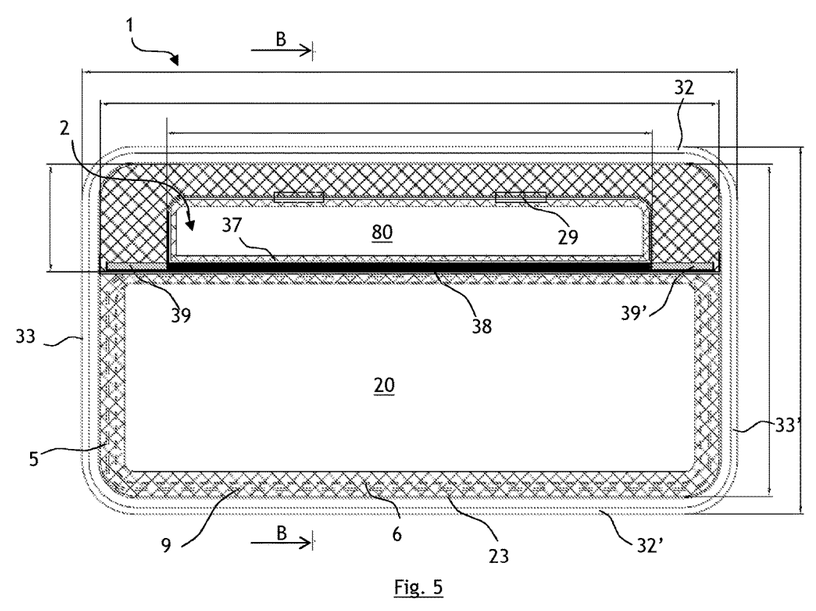
in FIG. 5, a second embodiment of glazing according to the invention, with an opening window, viewed from the interior space.

FIGS. 1 and 5 illustrate a side glazing 1 of a means of transport according to the invention, as may be seen by a passenger situated inside this means of transport.

It is, in particular, a side glazing of a train and FIG. 1 thus illustrates what a passenger on the train sees when looking out of a left or right side with respect to a general direction of travel of the train.

This glazing thus creates a vertical separation between an interior space I inside the train and an exterior space E outside the train.

This glazing 1 is fixed. In the first embodiment, that of FIG. 1, the glazing 1 is of a single piece, with no inward-opening window, whereas in the second embodiment, that of FIG. 5, the glazing 1 comprises an opening window 2.

This glazing 1 comprises:

an exterior substrate 10 which comprises two main faces:

an exterior face 11 which faces the exterior space E and an intermediate face 12 which is on the opposite side to the exterior face; this substrate moreover comprises a peripheral edge face 13, an interior substrate 20 which comprises two main faces: an interior face 21 which faces the interior space I and an intermediate face 22 which is on the opposite side to the interior face; this substrate moreover comprises a peripheral edge face 23, and a glazing frame structure 3 which holds the exterior substrate 10 and the interior substrate 20 fixedly together; however, there is a closed space between the two substrates: this is a glazing cavity 4.

The exterior substrate 10 and the interior substrate 20 are each of one piece.

In the second embodiment only, which will be described in greater detail later on, the exterior substrate 10 and the interior substrate 20 each comprise, in an upper part (considered in relation to the vertical), a hole 14, 24, each hole opening onto each face of each substrate and being separated from the peripheral edge face of the substrate, the holes in the substrates facing one another so as to make it possible to create an opening window 2, which means to say so as to make it possible to create the fixed perimeter of the opening window. The glazing frame structure 3 also holds the two substrates around the holes 14, 24.

The glazing frame structure 3 thus allows the two substrates 10, 20 to be held apart, even around the opening window, with a constant distance between the two substrates 10, 20.

The glazing 1 is multiple glazing insofar as it comprises several substrates 10, 20 and the glazing cavity 4 which is situated between the two substrates, this cavity being filled with air or with gas, preferably a neutral gas such as argon; this cavity contributes to the thermal insulation conferred by the glazing 1.

This glazing 1 is fixed glazing insofar as the glazing frame structure 3 is intended to be fixed to the structure of the means of transport (in this instance the train) without the possibility of moving with respect to this structure.

Figure 2:
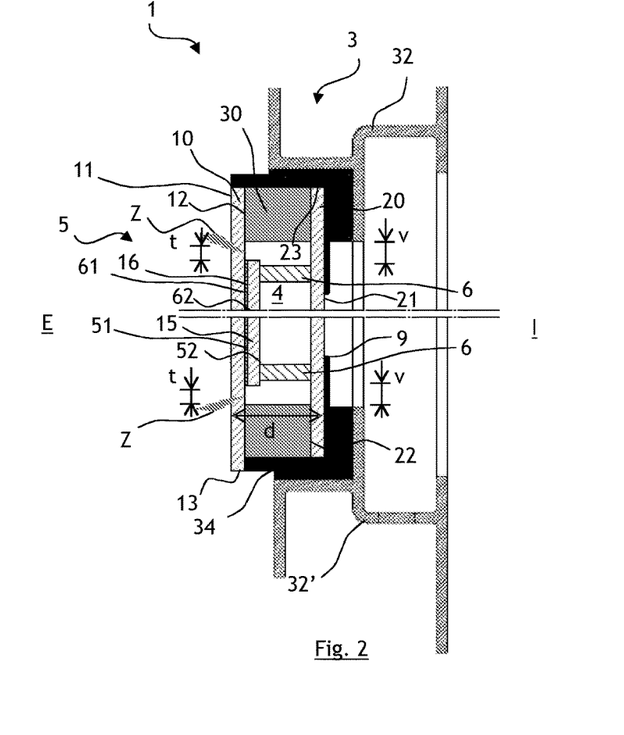
in FIG. 2, the glazing of FIG. 1, viewed in section on AA of this figure, according to a first alternative form.

As more particularly visible in FIG. 2, the glazing frame structure 3 comprises a peripheral spacing piece 30 (or "spacer") which is situated all around the periphery of the two substrates 10, 20, namely follows the peripheral edge face 13, 23 of these two substrates, ensuring continuity between these two edge faces and extending toward the center of the glazing.

This spacer piece is preferably made in a single piece.

This spacer piece here is positioned against the intermediate faces 12, 22 of the substrates, at the periphery of these intermediate faces 12, 22, without being in contact with the peripheral edge faces 13, 23 of the substrates. It is bonded laterally to the intermediate faces 12, 22 of the substrates.

The spacer piece may, for example, be made of plastic and/or of metal and/or of metal alloy; it allows the two substrates 10, 20 to be kept a constant distance apart and makes it possible to create the glazing cavity 4.

The spacer piece may comprise a profiled metal section piece, such as for example an aluminum profiled section piece, and a double bead of adhesive, to bond this profiled section piece to the peripheries of the intermediate faces 12 and 22; it may further comprise a sealing mastic and/or a glazing strip which holds the glazing in place by pressing it against an end stop of the opening.

With regard to the height of the spacer piece (when viewed vertically), the special lamination is special in that the main sheet of glass 15 and the main sheet of plastic 16 are set back by a setback t of at least 2 mm, and preferably at least 5 mm, with respect to said glazing frame structure 3, namely with respect to the peripheral spacer piece 30 at the top of this lamination, on the lateral sides and at the bottom of this lamination.

The glazing frame structure 3 moreover comprises top 32 and bottom 32' horizontal members as well as left 33 and right 33' side members (as viewed from the interior, as in FIG. 1). These members are preferably made of metal or metal alloy.

The glazing frame structure 3 further comprises a peripheral bead of adhesive 34 that allows the peripheral edge faces 13, 23 of the substrates and the peripheral spacer piece 30 to be bonded to the members 32, 32', 33, 33'. This bead of adhesive may for example be based on polyurethane or silicone or MS polymer or polysulfide.

The members 32, 32', 33 and 33' are optional because it is possible for the glazing to be bonded into the opening without the use of members or using only lateral members or horizontal members.

Checks have been conducted to ensure that adequate mechanical strength is obtained on the basis of the examples of FIGS. 1 to 4 when:

the two substrates 10, 20 are each made of a glass that has undergone a treatment aimed at strengthening it, such as a heat treatment and, in particular, toughening heat treatment and each have a thickness of from 3 to 8 mm, for example of 4 mm, the main sheet of glass 15 is made from a glass that has undergone no heat treatment aimed at strengthening it and has a thickness of 2 mm, the main sheet of plastic 16 is made of PVB and is 0.76 mm thick.

The main sheet of glass 15 may potentially be made of a glass that has undergone a treatment aimed at strengthening it, such as a heat treatment and particularly a toughening heat treatment.

Checks have been conducted to ensure that adequate thermal insulation is obtained on the basis of the example of FIGS. 1 to 4 when said glazing cavity 4 is of a single piece, filled with argon and has on the one hand a uniform thickness. The distance between the exterior face 11 and the interior face 21 is thus constant and here equal to 25.76 mm.

In the first embodiment of the invention, the intermediate face 12 of the exterior substrate 10, which faces the glazing cavity 4, comprises a lamination 5 comprising:

on the one hand, a main sheet of glass 15, and on the other hand, a main sheet of plastic 16, with this main sheet of plastic 16 being situated between the intermediate face 12 and the main sheet of glass 15, this main sheet of plastic 16 being in contact both with the intermediate face 12 and with the main sheet of glass 15, without the main sheet of glass 15 and without the main sheet of plastic 16 being in contact with said glazing frame structure 3.

The lamination thus comprises:

the main sheet of glass 15 which comprises two main faces: an exterior main face 51 which is oriented toward the exterior substrate 10 and a central intermediate face 52 which is on the opposite side, oriented toward the glazing cavity 4; this main sheet of glass 15 moreover comprises a peripheral edge face, and the main sheet of plastic 16 which comprises two main faces: an exterior main face 61 which is oriented toward the exterior substrate 10 and a central intermediate face 62 which is on the opposite side, oriented toward the glazing cavity 4; this main sheet of plastic 16 moreover comprises a peripheral edge face.

Thus, the glazing 1 comprises at least one exterior substrate which is laminated, but this lamination is particular because the sheet of plastic then the sheet of glass which are added in this order to the intermediate face of the substrate have a periphery which is pulled in in relation to the periphery of the substrate so that neither one nor the other is in contact with glazing frame structure 3. The edge faces of the sheets constituting the lamination are therefore not in contact with the glazing frame structure 3.

This feature can be seen more particularly in FIG. 1 which illustrates that the lamination 5 formed by the main sheet of glass 15 which is bonded to the intermediate surface 12 by the main sheet of plastic 16 finishes, at the top, at the bottom, to the left and to the right, at a distance s away from the peripheral edge face 13; this distance S is at least 5 mm and preferably at least 7 mm; it may, for example, be 6 mm, or 8 mm.

This feature is important in giving the glazing its safety glazing and evacuation glazing status: when the glazing 1 needs to be broken in order to allow evacuation, the interior substrate 20 is broken first of all, for example using a hammer; then repeated impacts against the main sheet of glass 15 will break this sheet then break the exterior substrate 10 at the point at which the lamination 5 (main sheet of glass 15+main sheet of plastic 16) is absent, namely at the point marked by the rupture zones Z, which are situated all around the lamination, along the distance s.

If the sheet of plastic and the sheet of glass which are added to the intermediate face of the exterior substrate extended as far as the peripheral edge face 13 of the substrate then these sheets would be in contact with the glazing frame structure 3 and the effort required to break the glazing in the event of an emergency would be too great to allow evacuation under the required conditions.

However, it is possible that the exterior substrate 10 may break, and in particular may break in a rupture zone Z where there is no lamination, under the effect of an impact from the outside, such as for example a stone from the track ballast being thrown against it by the blast from another train.

Thus, in order to make the glazing safe and prevent the exterior substrate 10 (and the lamination 5) from falling, at least one connecting bridge 6 is provided.

Figure 3:
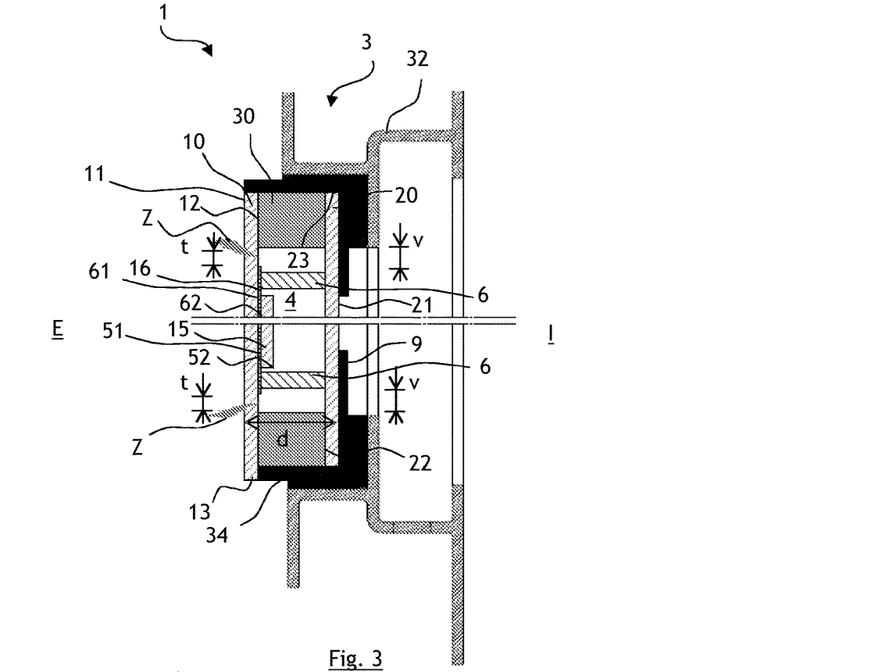
in FIG. 3, the glazing of FIG. 1, viewed in section on AA of this figure, according to a second alternative form.
Figure 4:
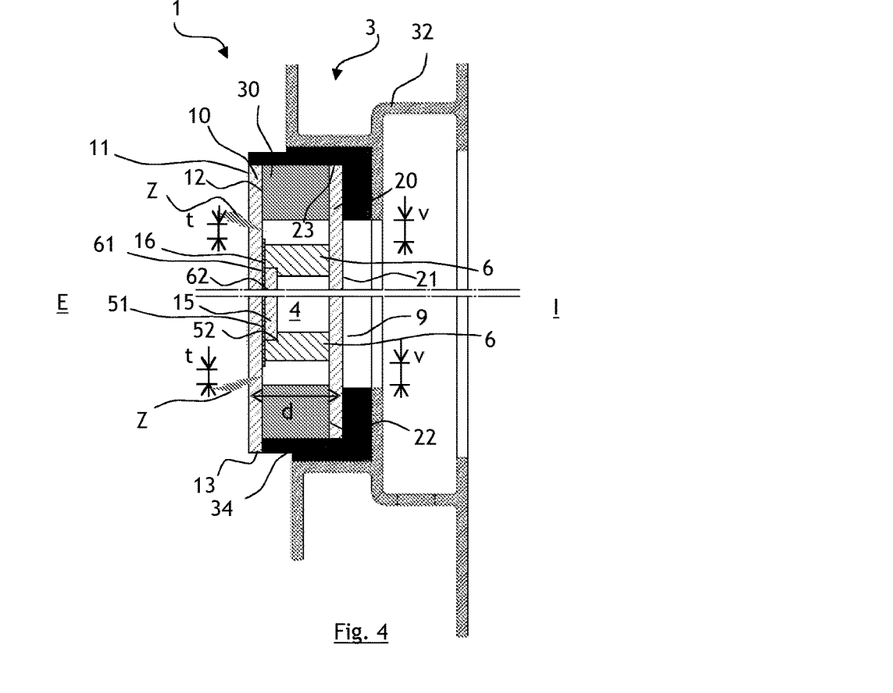
in FIG. 4, the glazing of FIG. 1, viewed in section on AA of this figure, according to a third alternative form.

This connecting bridge 6 may be situated:
between the intermediate face 22 of the interior substrate 20 and the central intermediate face 52 of the main sheet of glass 15, as illustrated in FIG. 2, or
between the intermediate face 22 of the interior substrate 20 and the central intermediate face 62 of the main sheet of plastic 16, as illustrated in FIG. 3, or
between, on the one hand, the intermediate face 22 of the interior substrate 20 and, on the other hand, both at the central intermediate face 52 of the main sheet of glass 15 and at the central intermediate face 62 of the main sheet of plastic 16, as illustrated in FIG. 4.

When the glazing 1 is considered face-on, as in FIG. 1, it is possible to consider that the glazing has a center which is in the plane of the sheet. Following this consideration, the glazing frame structure 3 is more centrifugal than the connecting bridge 6.

In this figure, the connecting bridge 6 is continuous and is separated from the glazing frame structure 3 over the entire length thereof; it is separated by a secondary glazing cavity, similar to the main glazing cavity 4. Along its periphery, the connecting bridge is not in direct contact with the glazing frame structure and is thus not in direct contact with the main spacer piece 30.

It is possible to make the connecting bridge 6 discontinuous; it may then be present over a length of between 20% and 95% of the periphery of said lamination 5. However, in that case, the connecting bridge 6 is also separated from the glazing frame structure 3.

There is no need to provide a large volume between the connecting bridge 6 and the glazing frame structure 3; it is enough to ensure that they are not connected to one another either mechanically or chemically (for example using adhesive) so that the exterior substrate 10 can easily be detached from the rest of the glazing in order to act as an escape route.

The connecting bridge 6 is situated at a distance v which, at the shortest, is between 2.0 and 30.0 mm, and preferably at a distance v which, at the shortest, is between 5.0 and 20.0 mm, away from said glazing frame structure 3.

A constant value v of 5.0 mm all around the connecting bridge gives good results: the zone Z is large enough that the substrate 10 can be detached from the rest of the glazing relatively easily without excessively reducing the field of view through the glazing.

The connecting bridge 6 here is a bead of polyurethane-based adhesive; it could also be a bead of adhesive based on silicone or on MS polymer or on polysulfide. The connecting bridge 6 may thus be made of the same material as the peripheral bead of adhesive 34.

FIG. 1 also shows a peripheral masking strip 9 situated on the interior face 21 of the interior substrate. This masking layer conceals the periphery of this interior face 21 and conceals the connecting bridge or bridges 6.

The connecting bridge 6 is thus situated, when viewed from the interior I, behind the masking strip 9 so as not to be visible to users of the means of transport.

A test has been carried out with glazing of the type illustrated in FIG. 2, with dimensions identical to commercial glazing, with a continuous peripheral connecting bridge 6. The exterior substrate 10 was broken, then the glazing was subjected to a program of stress loadings involving 200 raised/reduced pressure cycles at more or less 7 kPa. It was found that the broken exterior substrate 10 was still in place in the glazing at the end of the test, because it was firmly retained by the connecting bridge 6.

In the second embodiment, illustrated in FIGS. 5 to 8, the window 2, and it alone, is able to move with respect to the glazing frame structure 3. The window 2 is a window internal to the glazing 1 and can be opened insofar as it can be opened and closed with respect to the glazing frame structure 3, which is fixed. Of course, means are provided for guiding these opening and closing movements, and for limiting same. For safety reasons, the window 2 can be opened toward the interior space and not toward the exterior space.

In this second embodiment, the intermediate face 12 of the exterior substrate 10, the one that faces the glazing cavity 4, comprises, in a part of the glazing that is situated underneath said window:
on the one hand, a main sheet of glass 15
and on the other hand, a main sheet of plastic 16,
with this main sheet of plastic 16 being situated between the intermediate face 12 and the main sheet of glass 15,
this main sheet of plastic 16 being in contact both with the intermediate face 12 and with the main sheet of glass 15,
without the main sheet of glass 15 and the main sheet of plastic 16 being in contact with said glazing frame structure 3.

Thus, in the second alternative form, the glazing 1 has at least one of its substrates laminated, in this case the exterior substrate 10, but this lamination is particular because the sheet of plastic then the sheet of glass which are added in this order to the intermediate face of the exterior substrate have a periphery that is pulled in with respect to the periphery of the exterior substrate under the window 2 so that neither one nor the other is in contact with the glazing frame structure 3.

Figure 6:
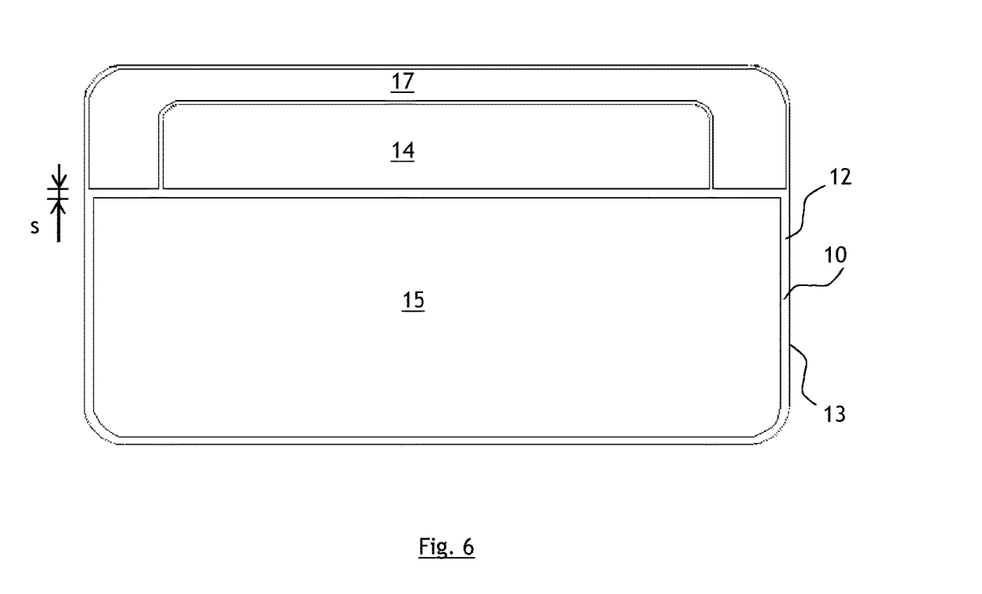
in FIG. 6, the exterior substrate of the glazing of FIG. 5, viewed from the glazing cavity and toward the exterior.

This feature can be seen more particularly in FIG. 6 which illustrates that the lamination formed by the main sheet of glass 15 which is bonded to the intermediate surface 12 by the main plastic 16 finishes at the top at a distance s from the lower edge of the hole 14 and also finishes at a distance, which is preferably the same, from the peripheral edge face 13; this distance s is at least 5 mm and preferably at least 7 mm; it may for example be 6 mm, or 8 mm.

This feature is important in giving the glazing its safety glazing status while at the same time making it possible to preserve the structure of the opening window; if the sheet of plastic and the sheet of glass which are added to the intermediate face of the substrate extended as far as the peripheral edge face 13 of the substrate and as far as the lower edge of the hole 14 or to the sides of the opening window, then these sheets would be in contact with the glazing frame structure 3 and the effort required to break the glazing under the window in the event of an emergency would carry the risk of damaging the window frame structure.

Now, if this structure becomes damaged, there is a risk that it will impede evacuation; one of the goals being pursued is to avoid that.

In the second alternative form of embodiment described here, only the intermediate face 12 of the exterior substrate 10 comprises, in a part of the glazing which is situated underneath said window, the main sheet of plastic 16 and then, on this main sheet of plastic, the main sheet of glass 15 (namely a lamination and more specifically the main lamination), but it may be conceivable for the intermediate face 22 of the interior substrate 20 also to comprise a lamination in part of the glazing situated underneath said window.

Figure 8:
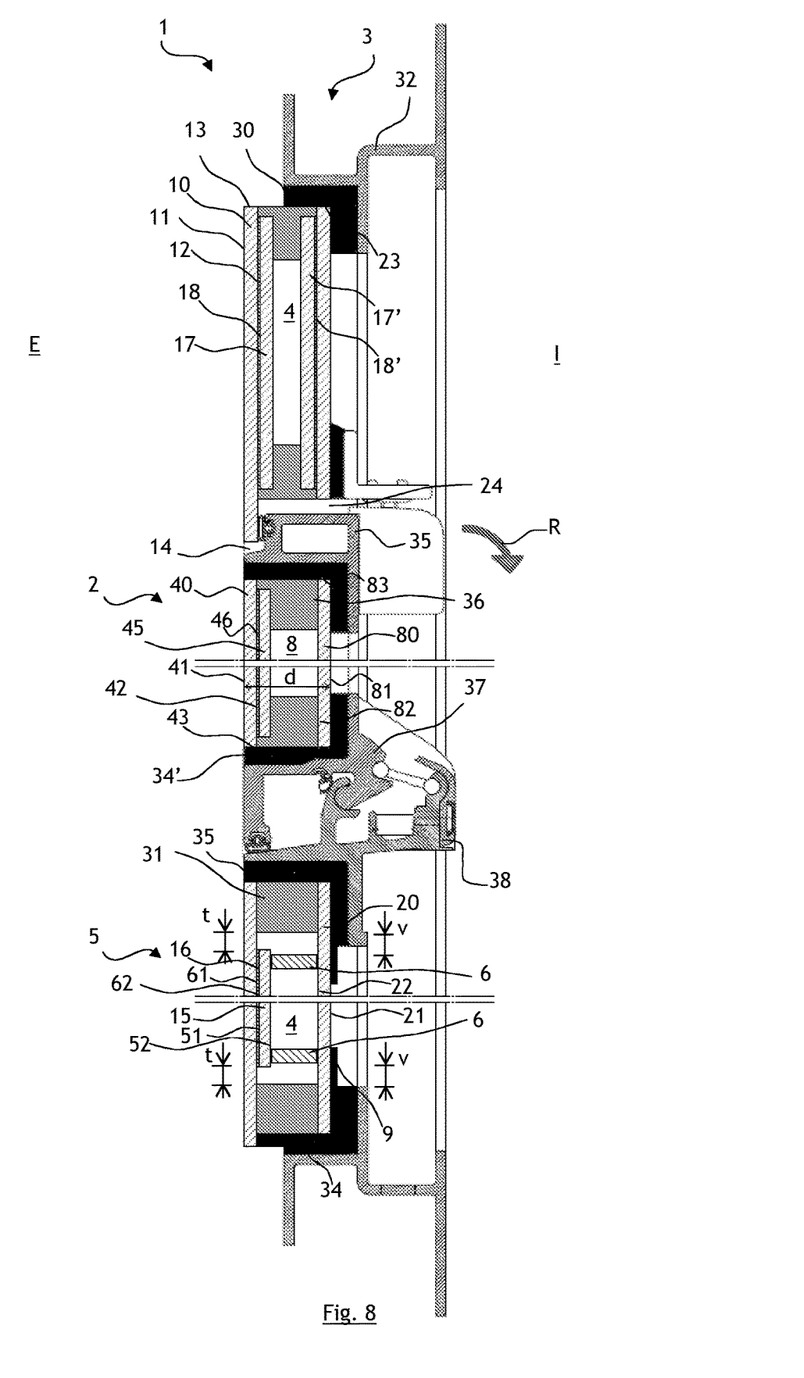

As visible more particularly in FIG. 8, the glazing frame structure 3 comprises two spacer pieces:
- a peripheral spacer piece 30 (or "spacer") which is situated all around the periphery of the two substrates 10, 20, namely which follows the peripheral edge face 13, 23 of these two substrates, and
- an internal spacer piece 31 (or "spacer") which is situated all around the periphery of the two holes 14, 24.

Each one of these two spacer pieces is preferably made as a single piece. They are not in contact with one another.

Each one of these two spacer pieces is in this instance positioned against the intermediate faces 12, 22 of the substrates, without being in contact with the peripheral edge faces 13, 23 of the substrates. They are bonded laterally to the intermediate faces 12, 22 of the substrates.

The spacer pieces may, for example, be made of plastic and/or of metal and/or of metal alloy; they make it possible to hold the two substrates 10, 20 a constant distance apart and create the glazing cavity 4.

With regard to the height of the spacer pieces (when observed vertically), the distance s mentioned hereinabove means that the main sheet of glass 15 and the main sheet of plastic 16 are set back by a setback t of at least 2 mm, and preferably of at least 5 mm, with respect to said glazing frame structure 3, mainly with respect to the internal spacer piece 31 at the top of this lamination and with respect to the peripheral spacer piece 30 on the lateral sides and at the bottom of this lamination.

The glazing frame structure 3 moreover comprises top 32 and bottom 32' horizontal members and left 33 and right 33' lateral members (as viewed from the interior, as in FIG. 5). These members are preferably made of metal or metal alloy.

This FIG. 5 moreover shows a peripheral masking strip 9 situated on the interior face 21 of the interior substrate. This masking layer conceals the periphery of this interior face 21, and the periphery of the opening window 2; this masking layer conceals the connecting bridge or bridges 6 and thus conceals everything which, toward the exterior, lies behind the periphery of the interior face 21 and the periphery of the opening window 2.

The glazing frame structure 3 furthermore comprises a peripheral bead of adhesive 34 that allows the peripheral edge faces 13, 23 of the substrates and the peripheral spacer piece 30 to be bonded to the members 32, 32', 33, 33'. This bead of adhesive may, for example, be based on polyurethane or on silicone or on MS polymer or on polysulfide.

The members 32; 32', 33 and 33' are optional because it is possible for the glazing to be bonded into opening without the use of members or using only lateral members or only horizontal members.

As visible in FIGS. 6 and 8, the intermediate face 12 of the exterior substrate comprises, in a part of the glazing situated above said window 2 (and more precisely in this figure, above the hole 14 that is to accommodate the window 2), on the one hand a secondary sheet of glass 17 and, on the other hand, a secondary sheet of plastic 18, which is interposed, in contact, between the intermediate face 12 and the secondary sheet of glass 17.

The secondary sheet of plastic 18 and the secondary sheet of glass 17 are also situated on each lateral side of said window (and more specifically in this figure on each lateral side of the hole 14 that is to accommodate the window 2).

Thus, the lamination with the secondary sheet of plastic 18 and the secondary sheet of glass 17 flanks the hole 14 from above and on the left and right-hand sides thereof, having the shape of an inverted U; this lamination does not extend below the hole 14 because it is another lamination that is present underneath this hole: the lamination with the main sheet of plastic 16 and the main sheet of glass 15.

For good mechanical integrity of the lamination above the window and to the sides thereof, the secondary sheet of glass 17 and the secondary sheet of plastic 18 are preferably in contact with said glazing frame structure 3 and, more particularly here, near the peripheral edge face 13 in contact with the peripheral spacer piece 30 and near the hole 14 in contact with the internal spacer piece 31.

The secondary sheet of glass 17 preferably has the same thickness as the main sheet of glass 15 and the secondary sheet of plastic 18 preferably has the same thickness as the main sheet of plastic 16; however, these sheets of glass and its sheets of plastic do not overlap.

Figure 7:
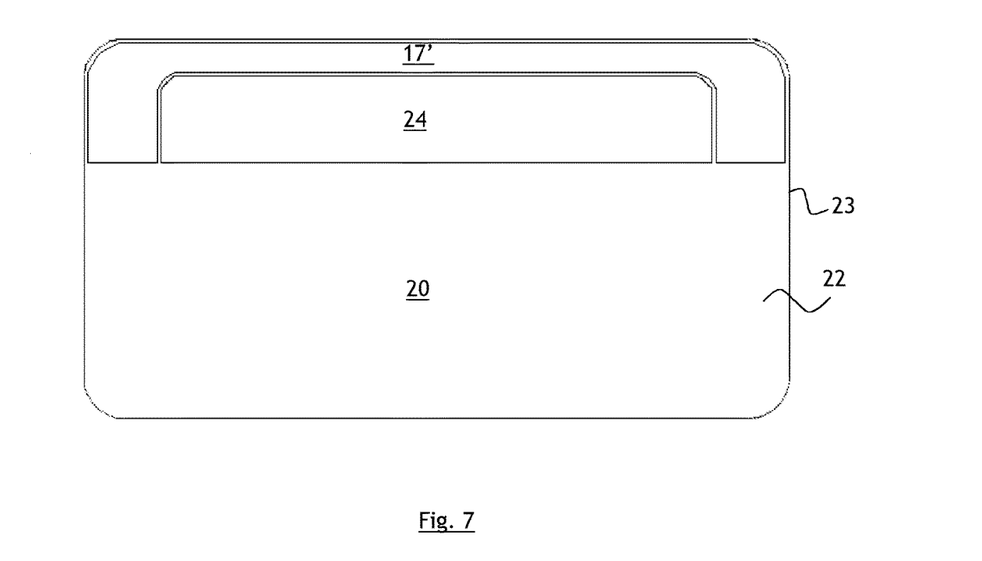
in FIG. 7, the interior substrate of the glazing of FIG. 5, viewed from the glazing cavity and toward the interior; and in FIG. 8, the glazing of FIG. 5 viewed in section on BB of this figure.

As visible in FIGS. 7 and 8, the intermediate face 22 of the interior substrate comprises, in a part of the glazing situated above said window 2 (and, more specifically in this figure, above the hole 24 that is to accommodate the window 2), on the one hand, a secondary sheet of glass 17' and, on the other hand, a secondary sheet of plastic 18' which is interposed, in contact, between the intermediate face 22 and the secondary sheet of glass 17'.

The secondary sheet of plastic 18' and the secondary sheet of glass 17' are also situated on each lateral side of said window (and more specifically in this figure, on each lateral side of the hole 24 that is to accommodate the window 2).

For good mechanical integrity of this lamination, the secondary sheet of glass 17' and the secondary sheet of plastic 18' are preferably in contact with said glazing frame structure 3 and more particularly here, near the peripheral edge face 23 in contact with the peripheral spacer piece 30 and near the hole 24 in contact with the internal spacer piece 31.

Checks have been carried out to ensure that adequate mechanical integrity is obtained on the basis of the example of FIGS. 5 to 8, when:
  the two substrates 10, 20 are each made of a glass that has undergone a treatment aimed at strengthening it, such as a heat treatment and, in particular, a toughening heat treatment and are each 3 to 8 mm, for example 4 mm, thick,
  the main sheet of glass 15 and the two secondary sheets of glass 17, 17' are all three of them made of a glass that has undergone no treatment aimed at strengthening it and are each 2 mm thick,
  the main sheet of plastic 16 and the two secondary sheets of plastic 18, 18' are all three of them made of PVB and each 0.76 mm thick.

The main sheet of glass 15 and the two secondary sheets of glass 17, 17' may potentially be made of a glass that has undergone a treatment aimed at strengthening them, such as a heat treatment and particularly a toughening heat treatment.

Checks have been conducted to ensure that adequate thermal insulation is obtained on the basis of the example of FIGS. 5 to 8, when said glazing cavity 4 is situated all around said window 2, of one piece, filled with argon and has, on the one hand, a uniform thickness in its part underneath the window 2 and, on the other hand, a uniform thickness in its part on each side of and above the window 2.

The distance between the exterior face 11 and the interior face 21 is thus constant and here equal to 25.76 mm.

As can be seen in FIG. 8, the window 2 comprises an exterior pane element 40, an interior pane element 80 and a window frame structure 35 that holds the exterior pane element 40 with the interior pane element 80 creating a window cavity 8 which is thus situated between the exterior pane element 40 and the interior pane element 80:
  the exterior pane element 40 comprises two main faces: an exterior face 41 which faces the exterior space E, and an intermediate face 42 which is on the opposite side to the exterior face; the exterior pane element 40 also comprises a peripheral edge face 43,
  the interior pane element 80 comprises two main faces: an interior face 81 which faces the interior space I and an intermediate face 82 which is on the opposite side to the interior face; the interior pane element 80 moreover comprises a peripheral edge face 83.

As more particularly visible in FIG. 8, the window frame structure 35 comprises a peripheral window spacer piece 36 (or "spacer") which is situated all around the periphery of the two pane elements 40, 80.

This peripheral window spacer piece 36 is preferably made as one piece and here positioned against the intermediate faces 42, 82 of the pane elements, without being in contact with the peripheral edge faces 43, 83 of these pane elements.

This spacer piece may for example be made of plastic and/or of metal and/or of metal alloy and allows the two pane elements 40, 80 to be kept at a constant distance apart and makes it possible to create the window cavity 8.

The window frame structure 35 moreover comprises top and bottom horizontal members, as well as left and right lateral members. These members are preferably made of metal or of metal alloy.

The window frame structure 35 furthermore comprises a peripheral bead of adhesive 34' which allows the peripheral edge faces 43, 83 of the pane elements and the peripheral window spacer piece 36 to be bonded to the members. This bead of adhesive 34' is preferably made of the same material as the peripheral bead of adhesive 34.

The face 42 of the exterior pane element that faces into the window cavity 8 comprises:
  on the one hand, a window sheet of glass 45
  and on the other hand, a window sheet of plastic 46,
    with this window sheet of plastic 46 being situated between the intermediate face 42 and the window sheet of glass 45,
    this window sheet of plastic 46 being in contact both with the intermediate face 42 and with the window sheet of glass 45,
    with the window sheet of glass 45 and the window sheet of plastic 46 being in contact with the window frame structure 35 (and, more particularly here, with the peripheral bead of adhesive 34').

The two pane elements 40, 80 are each made of a glass that has undergone a treatment aimed at strengthening it, such as a heat treatment and, in particular, a toughening heat treatment and each have the same thickness as the substrates 10, 20 respectively.

The window sheet of glass 45 has the same thickness as the main sheet of glass 15 and the window sheet of plastic 46 has the same thickness as the main sheet of plastic 16.

The distance d between the exterior face 41 and the interior face 81 is thus constant and here 25.76 mm; it is identical to the distance between the exterior face 11 and the interior face 21.

The window 2 can move with respect to the glazing frame structure 3 in a movement of rotation illustrated by the double arrow R in FIG. 8, toward the interior; this movement is limited to an angle of opening of around 45°.

In order to allow this opening, the glazing frame structure 3 comprises a horizontal crossmember 38 situated underneath said window 2 which allows the bottom horizontal member 37 of the window frame to pivot on itself about a horizontal axis and with respect to the horizontal crossmember 38.

Two handles 29 are provided on the upper member of the window frame structure 35 to make the window 2 easier for passengers wishing to open or close it to grasp.

The crossmember 38 is also preferably made of metal or metal alloy and is bonded to the interior face 21 of the interior substrate 20 by the bead of adhesive that surrounds the holes 14, 24.

This crossmember 38 is not in contact with two lateral members 33, 33' of the glazing frame structure 3.

However, in order to conceal the absence of lamination to the left and to the right of the member 38 over a few millimeters, lateral masks 39, 39' are bonded to the interior face 21, as visible in FIG. 5. A decorative pattern, applied for example by screen printing, to the intermediate faces 12 and 22 may also perform this esthetic function.

As visible in FIG. 8, the glazing 1 according to the invention has no element that protrudes toward the exterior beyond the exterior face 11 of the exterior substrate 10.

Thus, to make the glazing safe and prevent the exterior substrate 10 (and the lamination 5) from falling off in the event of accidental breakage of this substrate, at least one connecting bridge 6 is provided.

This connecting bridge 6 may be situated between the intermediate face 22 of the interior substrate 20 and the central intermediate face 52 of the main sheet of glass 15, as illustrated in FIG. 8.

This connecting bridge 6 could also be situated:
- between the intermediate face 22 of the interior substrate 20 and the central intermediate face 62 of the main sheet of plastic 16 (not illustrated), or
- between, on the one hand, the intermediate face 22 of the interior substrate 20 and, on the other hand, both at the central intermediate face 52 of the main sheet of glass 15 and at the central intermediate face 62 of the main sheet of plastic 16 (not illustrated).

The present invention has been described in the foregoing by way of example. It must be appreciated that a person skilled in the art is confident to create various alternative forms of the invention without thereby departing from the scope of the patent as defined by the claims.

In particular, the present invention includes the possibility of the interior substrate 20 itself being laminated, with:
- on the one hand, an accessory sheet of glass,
- and, on the other hand, an accessory sheet of plastic,
  - with this accessory sheet of plastic being situated between the intermediate face 22 of the interior substrate 20 and the accessory sheet of glass.

In that case of course it must be appreciated that the expression "a peripheral edge of the intermediate face 22 of the interior substrate 20" refers to a peripheral edge of the intermediate face which may be the face of the accessory sheet of glass and/or that of the accessory sheet of plastic, and which is in contact with the glazing cavity 4.

Moreover, the shortest distance v between the connecting bridge 6 and the adjacent glazing frame structure 3 is depicted in the drawings as being greater than the distance t between the lamination and the glazing frame structure 3, but it could be the same as, or even shorter than, the distance t. The important consideration is that this connecting bridge 6 be separated from the adjacent glazing frame structure 3.

The invention claimed is:

1. A side glazing for a means of transport, said glazing being fixed multiple glazing, said glazing comprising:
   an exterior substrate having an exterior face which faces an exterior space, an intermediate face on the opposite side to the exterior face, and a peripheral edge face,
   an interior substrate having an interior face which faces an interior space, an intermediate face on the opposite side to the interior face, and a peripheral edge face,
   a glazing frame structure which is situated at the periphery of the intermediate face of said exterior substrate and at the periphery of the intermediate face of said interior substrate and which holds the exterior substrate and the interior substrate together in such a way that the glazing separates said exterior space from said interior space with a glazing cavity situated between the exterior substrate and the interior substrate, the glazing frame structure comprising a peripheral spacer arranged between the intermediate face of the exterior substrate and the intermediate face of the interior substrate to space apart the exterior substrate and the interior substrate from each other,
   and a lamination comprising at least one main sheet of glass and a main sheet of plastic, said main sheet of plastic being situated in contact between the intermediate face of said exterior substrate and the main sheet of glass, and
   at least one connecting bridge which is separate from said peripheral spacer of the glazing frame structure and makes a connection between a peripheral edge of said lamination and a surface, situated transversely opposite said peripheral edge, on the other side of said glazing cavity, the least one connecting bridge being out of contact with the peripheral spacer.

2. The glazing as claimed in claim 1, wherein said lamination is not in direct contact with said peripheral spacer of the glazing frame structure or is not directly mechanically connected and/or chemically bonded to said peripheral spacer of the glazing frame structure.

3. The glazing as claimed in claim 1, wherein said connecting bridge is continuous and is separated from said glazing frame structure over its entire peripheral length.

4. The glazing as claimed in claim 1, wherein said connecting bridge is discontinuous over its peripheral length and is present, separated from said glazing frame structure, over a peripheral length of between 20% and 95% of the peripheral length of said lamination.

5. The glazing as claimed in claim 1, wherein said connecting bridge is situated at a distance which, at the shortest, is between 2.0 and 30.0 mm away from said glazing frame structure.

6. The glazing as claimed in claim 1, wherein said connecting bridge comprises a bead of adhesive.

7. The glazing as claimed in claim 1, wherein said connecting bridge is situated, when viewed from the interior and/or when viewed from the exterior, behind a masking strip.

8. The glazing as claimed in claim 1, wherein each of the exterior and interior substrates is made of a glass that has undergone a chemical or heat treatment aimed at strengthening it.

9. A side glazing for a means of transport, said glazing being fixed multiple glazing, said glazing comprising:
   an exterior substrate having an exterior face which faces an exterior space, an intermediate face on the opposite side to the exterior face, and a peripheral edge face,
   an interior substrate having an interior face which faces an interior space, an intermediate face on the opposite side to the interior face, and a peripheral edge face,
   a glazing frame structure which is situated at the periphery of the intermediate face of said exterior substrate and at the periphery of the intermediate face of said interior substrate and which holds the exterior substrate and the interior substrate together in such a way that the glazing separates said exterior space from said interior space with a glazing cavity situated between the exterior substrate and the interior substrate,
   and a lamination comprising at least one main sheet of glass and a main sheet of plastic, said main sheet of plastic being situated in contact between the intermediate face of said exterior substrate and the main sheet of glass, and
   at least one connecting bridge which is separate from said glazing frame structure and makes a connection between a peripheral edge of said lamination and a surface, situated transversely opposite said peripheral edge, on the other side of said glazing cavity,
   wherein said exterior substrate and said interior substrate each comprise, in an upper part, a hole opening onto each face of the substrate and separated from the peripheral edge face of the substrate, the holes in the exterior and interior substrates facing one another so as to allow the creation of an opening window, the glazing frame structure furthermore holding the exterior and interior substrates around the holes and, in a part of the glazing that is situated under said window, said lamination is not in contact with said glazing frame structure.

10. The glazing as claimed in claim 9, wherein said glazing frame structure comprises a horizontal crossmember situated underneath said window, said crossmember not being in contact with two lateral uprights of the glazing frame structure.

11. The glazing as claimed in claim 9, wherein said glazing cavity is situated all around said window.

12. The glazing as claimed in claim 9, wherein said glazing does not comprise any element that projects toward the exterior beyond the exterior face of the exterior substrate.

13. The glazing as claimed in claim 1, wherein the means of transport is a train.

14. The glazing as claimed in claim 5, wherein the distance, at the shortest, is between 5.0 and 20.0 mm, away from said glazing frame structure.

15. The glazing as claimed in claim 6, wherein the bead of adhesive is based on polyurethane or on silicone or on modified silane polyether or on polysulfide.

16. The glazing as claimed in claim 1, wherein the peripheral spacer is in contact with both the intermediate face of the exterior substrate and the intermediate face of the interior substrate.

* * * * *